(12) United States Patent
Seegert et al.

(10) Patent No.: US 6,490,850 B1
(45) Date of Patent: Dec. 10, 2002

(54) MOWER BLADE

(75) Inventors: Brian David Seegert, Hartford, WI (US); Jeffrey Robert Braun, Colgate, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/910,502

(22) Filed: Jul. 19, 2001

(51) Int. Cl.⁷ .............................................. A01D 34/73
(52) U.S. Cl. .................... 56/295; 56/255; 56/DIG. 17; 56/DIG. 20
(58) Field of Search .................... 56/295, 255, 17.5, 56/DIG. 17, DIG. 20

(56) References Cited

U.S. PATENT DOCUMENTS

| | | | |
|---|---|---|---|
| 3,780,509 A | 12/1973 | Woelffer ..................... 56/295 |
| 4,318,268 A | * 3/1982 | Szymanis | |
| 5,094,065 A | * 3/1992 | Azbell | |
| 5,327,710 A | 7/1994 | Plamper et al. ............... 56/255 |
| 5,353,581 A | * 10/1994 | Rouse et al. | |
| 5,363,635 A | 11/1994 | White, III et al. ............ 56/255 |
| 5,363,636 A | 11/1994 | Lamoureux ................... 56/255 |
| 5,473,873 A | 12/1995 | Sheldon ...................... 56/255 |
| 5,501,068 A | 3/1996 | Martz ......................... 56/255 |
| 5,615,542 A | 4/1997 | Thorud et al. ................ 56/255 |
| 5,711,141 A | * 1/1998 | Pitman et al. | |
| 6,052,979 A | * 4/2000 | Tutchka | |

* cited by examiner

Primary Examiner—Thomas B. Will
Assistant Examiner—Meredith C. Petravick

(57) ABSTRACT

A mower blade with a trailing sweeping edge that projects below the cutting edge serves to brush, cut particles deposited on the grass surface down between the grass blades and up into the air stream within the mower deck. As the cut particles are recirculated in the air stream, they are recut in a mulching action. The particles forced down between the grass blades reduce the amount of cut grass that has to be discharged. As a result, the amount of cut grass particles left on the lawn is reduced, thereby providing an improved appearance.

5 Claims, 2 Drawing Sheets

MOWER BLADE

FIELD OF THE INVENTION

The present invention relates to mower decks for cutting grass and similar vegetation and more specifically to a blade that improves discharge of cut material from the deck and reduces the accumulation of cut material on the surface of the lawn.

BACKGROUND OF THE INVENTION

The great majority of yard and landscaped grasses are cut with mower decks. When the grass to be cut is long and/or wet, the cut particles may not be as efficiently discharged from the deck.

To reduce the inconvenience associated with discharging and/or collecting cut grass, mulching decks have grown in favor. With a mulching deck, the grass is recirculated within the air stream of the cutting chamber, causing it to be recut several times into smaller and smaller pieces and then forced by the air stream down and into the spaces between the standing blades of grass. While this mulching process eliminates the need to keep the long and/or wet grass particles airborne long enough to discharge them, it can leave clipping drops or clumps of cut grass on the surface of the lawn.

Therefore, it would be desirable to provide a mower blade that helps to recirculate cut particles so that they can be recut, more easily remain airborne and more efficiently be discharged.

Further, it would be desirable to provide a blade that would reduce the incidence of clipping drops or clumps left on the cut grass surface.

SUMMARY OF THE INVENTION

Toward these ends, there is provided a blade for use in a rotary mower deck for cutting grass and similar vegetation. The blade includes a sweeping edge along the surface trailing the cutting edge. The sweeping edge projects below the horizontal plane of the cutting edge to brush the top portion of the cut grass blades and lift some portion of the cut particles laying thereon back into the swirling air stream within the cutting chamber. As the cut grass particles are lifted to be recirculated and recut, they are lighter and it is easier to keep them airborne for discharge. The brushing effect of the sweeping edge further serves to force cut grass particles downwardly into the spaces between the blades of uncut grass. As a result, the finished appearance of the cut lawn is improved as is the discharge of cut material.

DESCRIPTION OF THE PREFERRED EMBODIMENT

Figure 1:
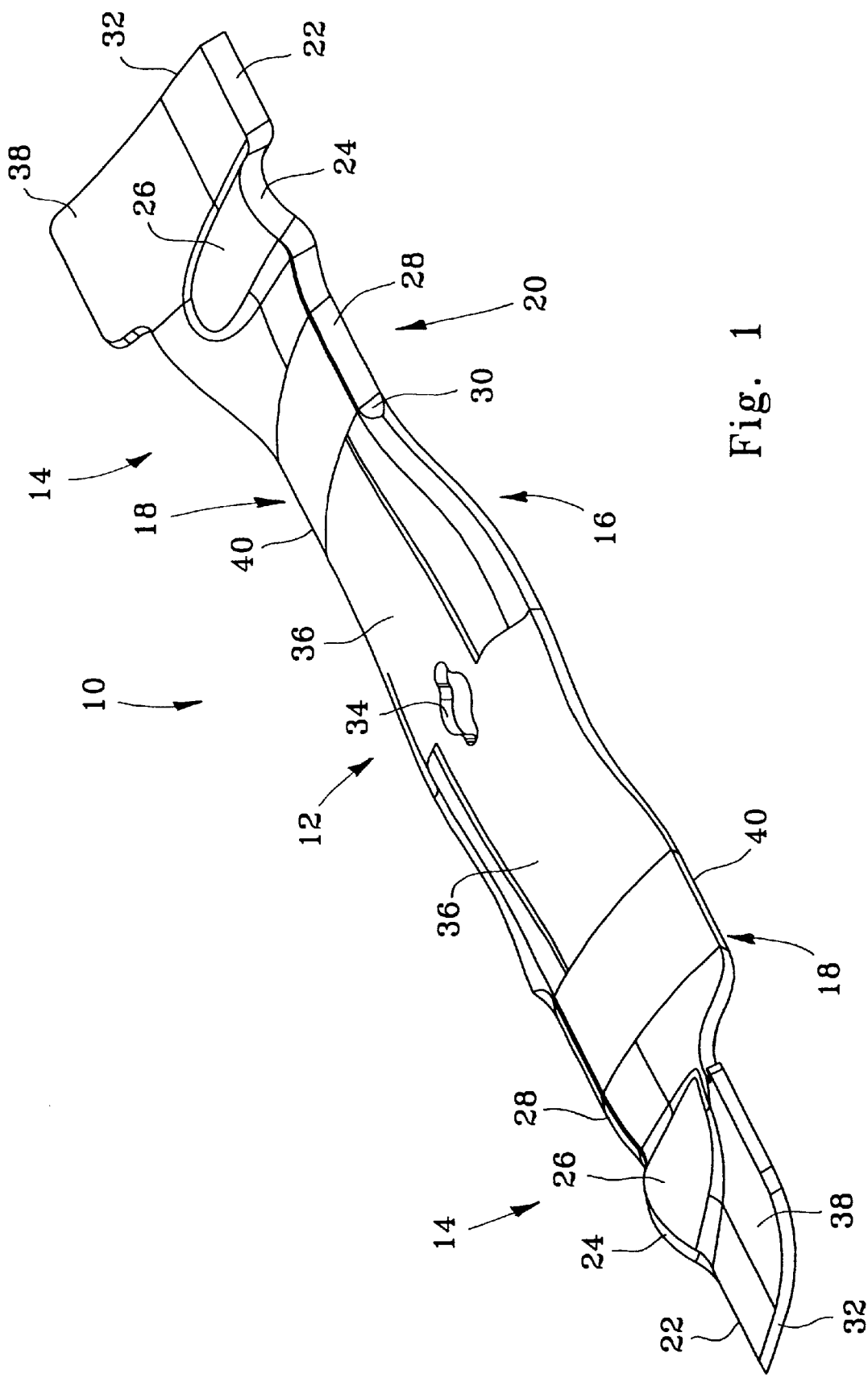
FIG. 1 is an elevated side perspective view of a blade made in accordance with the present invention.

Looking first to FIG. 1, there is illustrated an elevated perspective view of a rotary mower cutting blade, 10 utilizing the improvement of the present invention. The blade 10 is of the type that could typically be mounted on a mower deck as would be used with lawn, lawn and garden tractors and similar vehicles.

The elongated mower blade 10 includes a center portion 12 adapted to support it for rotation in a generally horizontal plane. The support, while not shown, would typically be comprised of a bolt attaching it to a spindle. The spindle would be powered by a belt or gear driven structure carried on the mower deck. Adjoining the opposite sides of the center portion 12 are end portions 14 which are integrally formed as a part of the blade 10. The end portions 14 are essentially reverse images of one another and in all material respects will be identical. Accordingly, only one end portion 14 and its structure need be discussed in detail.

The end portion 14 carries a leading surface 16 and a trailing surface 18. The leading surface 16 is in front as the blade 10 is rotatably driven by the power source. As viewed in FIG. 1, the blade 10 would be rotated in a clockwise direction and the leading surface 16 is on the upper right hand side of FIG. 1. Along the leading surface 16 of the blade 10 is carried a cutting edge 20. This cutting edge 20 is comprised of an outer cutting edge portion 22, a mulch hump cutting portion 24 carried by a mulch hump 26 and an inner cutting portion 28 having a terminal end 30. The cutting edge 20 extends between the outer end 32 of the end portion 14 and extends inwardly approximately one-half of the distance to the mounting hole or opening 34 of the blade 10. Between that terminal end 30 of the cutting edge 20 and the mounting hole 34 is a structural support portion 36 of the blade 10 that carries the end portion 14.

Along the rear half of the outer tip of the end portion 14 is carried a wing section 38 that is designed to lift and throw material cut by the cutting edge 20 of the blade 10. The wing section 38 further serves to create an air stream within the cutting chamber that acts to lift the grass blades for cutting.

As noted, a mulch hump 26 is provided at the leading surface 16 between the outer cutting edge 22 and the inner cutting edge 28. The purpose of the mulch hump 26 is to provide additional cutting at a different height of grass than is provided by the outer cutting edge 22. By being at a different level, it will cut grass into smaller pieces. It also helps direct grass downwardly into the standing grass blades.

Figure 2:
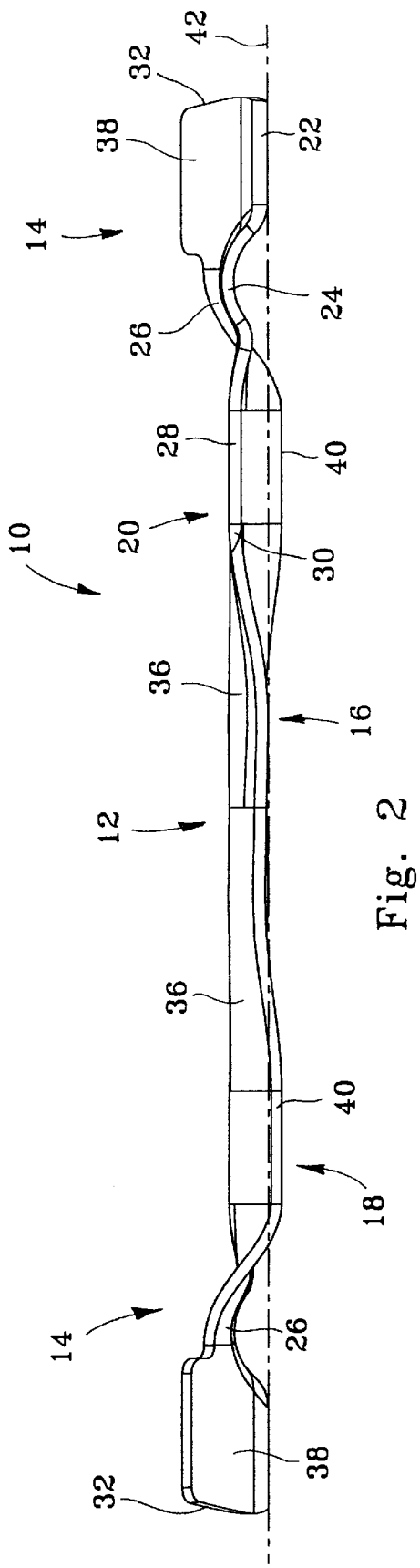
FIG. 2 is a side view of the cutting blade illustrated in FIG. 1.
Figure 3:
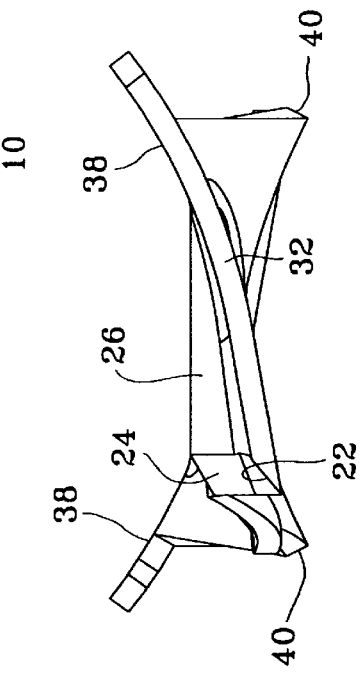
FIG. 3 is an end view of the cutting blade illustrated in FIG. 1.

At the trailing surface 18 of the blade 10, as can best be seen in both FIGS. 1 and 2, is provided a sweeping edge 40. The sweeping edge 40, as can be seen in FIG. 2, projects downwardly below the plane 42 of cutting provided by the cutting edge 20 and extends approximately ⅓ of the way across the blade 10. While the preferred embodiment includes an uplifted wing 38 and a mulch hump 26, non-mulching blades could be provided with a sweeping edge 40 that extends all the way to the outer end 32 of the blade 10.

In operation, the blade 10 would be rotatably carried on a bolt or shaft extending through the mounting hole 34 provided in the center of the blade 10 and rotate about a vertical axis with the blade 10 moving in a generally horizontal plane. As the blade 10 is advanced across the grass or lawn, the cutting edge 20 would sweep in a circle to cut the grass along the complete sharpened cutting edge 20. The primary cutting to the desired height would occur along the generally horizontal outer cutting edge portion 22 of the cutting edge 20, which would be generally parallel to the ground. Further cutting of the grass at a different height would occur at the mulch hump cutting edge portion 24 and again at the interior cutting edge portion 28, with each of these cutting actions occurring at different heights to chop the grass into small pieces. As the blade 10 rotates in a circle while being advanced, the cutting edge 22 would sweep through the path originally swept by the mulch hump cutting edge portion 24 and the inner cutting portion 28 to cut the grass to the proper height. During this cutting activity, the wing 38 would be lifting and throwing the material as well as generating an air stream within the cutting chamber of the deck. This would continue to provide a swirling motion of the cut grass and air within the chamber to recut and recut the grass particles as they are recirculated.

At the rear surface 18 of the blade 10, the sweeping edge 40 would contact the top edge of the cut grass blades, brushing them down. This brushing effect would serve the purpose of cleaning any accumulated materials that fall on top of the grass from the top of the grass to bring them back up to be recirculated in the swirling air stream within the cutting chamber. Further, as the sweeping edge 40 brushes the grass, it would open up areas between the blades of grass for the cut particles to fall down into. The pressure created by the air stream would further serve to force the cut particles down between the standing grass blades.

Through brushing the top of the grass, the sweeping edge 40 reduces the frequency of the occurrence of clumping or dropped grass on top of the lawn surface. While the preferred embodiment of the blade 10 utilizes a mulching design, this sweeping area 40 could be provided to blades not having the mulch design nor having the uplifted wing 38. Accordingly, the sweeping edge 40 could be provided along the whole trailing edge 18 of the blade 10 directly behind the cutting edge 20 on the leading surface 16 of the blade 10.

The present blade design is contemplated to be used on a single spindle deck or a deck having a plurality of blades and accordingly the advantages flowing from the design could be realized with those variations in application.

Having described the preferred embodiment, it will become apparent that various modifications can be made without departing from the scope of the invention as defined in the accompanying claims.

What is claimed is:

1. An elongated mower blade having a center portion adapted to support it for rotation in a generally horizontal plane, opposite end portions coupled to the center portion for rotation therewith, at least one end portion having a leading and trailing surface with the leading surface having a cutting edge including a plurality of cutting edge portions, a first of the cutting edge portions having a cutting plane associated therewith, the first cutting edge portion being positioned generally lower than any remaining cutting edge portion along the longitudinal axis of the blade, and said trailing surface having a sweeping edge that projects below the cutting plane associated with the first cutting edge portion.

2. The invention defined in claim 1 wherein the one end portion has an outer end and the cutting edge extends inwardly along the leading surface approximately one half the distance to the center portion.

3. The invention defined in claim 1 wherein the sweeping edge extends along the trailing surface directly behind approximately one third of the cutting edge.

4. The invention defined in claim 1 wherein the leading surface further includes a mulch hump.

5. The invention defined in claim 1 wherein the blade further includes a wing section directly behind a portion of the cutting edge.

* * * * *